US009420907B2

(12) United States Patent
Ni

(10) Patent No.: US 9,420,907 B2
(45) Date of Patent: Aug. 23, 2016

(54) BEVERAGE BOTTLE WITH ACCESSIBLE STATION FOR PORTABLE ELECTRONIC DEVICE

(71) Applicant: SIMPLE HAPPINESS & HEALTH, San Marino, CA (US)

(72) Inventor: Zhenming Ni, San Marino, CA (US)

(73) Assignee: SIMPLE HAPPINESS & HEALTH, San Marino, CA (US)

( * ) Notice: Subject to any disclaimer, the term of this patent is extended or adjusted under 35 U.S.C. 154(b) by 0 days.

(21) Appl. No.: 14/611,274

(22) Filed: Feb. 1, 2015

(65) Prior Publication Data

US 2016/0198877 A1  Jul. 14, 2016

Related U.S. Application Data

(60) Provisional application No. 62/105,735, filed on Jan. 20, 2015.

(30) Foreign Application Priority Data

Jan. 9, 2015  (CN) .......................... 2015 1 0011822

(51) Int. Cl.
| H04M 1/00 | (2006.01) |
| A47G 19/22 | (2006.01) |
| H05B 37/02 | (2006.01) |
| H04M 1/02 | (2006.01) |
| A45C 11/00 | (2006.01) |

(52) U.S. Cl.
CPC .......... *A47G 19/2227* (2013.01); *A45C 11/00* (2013.01); *H04M 1/0202* (2013.01); *H05B 37/0209* (2013.01); *A45C 2011/002* (2013.01)

(58) Field of Classification Search
USPC ................................ 455/550.1, 556.1, 575.1
See application file for complete search history.

(56) References Cited

U.S. PATENT DOCUMENTS

| 6,396,925 B1* | 5/2002 | Close ..................... H04M 1/04 379/446 |
| 8,777,044 B1* | 7/2014 | Raymus ............. A47G 19/2272 215/12.1 |
| 2008/0223739 A1* | 9/2008 | Thompson ......... A47G 19/2227 206/217 |
| 2011/0303708 A1* | 12/2011 | Dudley ..................... A45F 5/00 224/148.1 |
| 2014/0216959 A1* | 8/2014 | Raymus ............. A47G 19/2272 206/221 |
| 2014/0326731 A1* | 11/2014 | Raymus ............. A47G 19/2272 220/524 |

* cited by examiner

*Primary Examiner* — Fayyaz Alam

(74) *Attorney, Agent, or Firm* — Raymond Y. Chan; David and Raymond Patent Firm

(57) ABSTRACT

A beverage bottle for a portable electronic device, includes a hand-held container comprising a surrounding wall and having a fluid compartment formed within the surrounding wall, and an accessible station integrated with the hand-held container, wherein the accessible station has a window cavity for accommodating the portable electronic device therein so as to allow the portable electronic device through the window cavity. Therefore, the portable electronic device is carried and protected by the container and is accessible through the accessible station.

24 Claims, 10 Drawing Sheets

BEVERAGE BOTTLE WITH ACCESSIBLE STATION FOR PORTABLE ELECTRONIC DEVICE

CROSS REFERENCE OF RELATED APPLICATION

This is a non-provisional application that claims priority to U.S. provisional application, application No. 62/105,735, filed Jan. 20, 2015.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a water bottle, and more particular to a beverage bottle integrated with an accessible station not only providing a window cavity for accommodating an object having an appropriate size, such as a portable electronic device, with protection feature but also allowing the user to quickly access the portable electronic device in the accessible station.

2. Description of Related Arts

Water is essential for the human body to function for maintaining the health and integrity of every cell in the body, wherein water plays a main role in the body to perform virtually every metabolic process. Especially for exercisers, the goal of drinking water before, during, and post-workout is to prevent dehydration and maintain performance. Therefore, almost all exercisers would like to carry their own water bottles to ensure the water quality for personal health and hygiene purpose.

More and more people are willing to go to a fitness center because there are different training-related equipments to strength different parts of the body. At the mean time, they must carry their personal items, such as keys, wallet, mobile phone, and water bottle, during workout. For convenience, they will carry a bag to store all the personal items. In addition, most of the training-related equipments provide a holder to hold the water container, such that people can drink water as they need during workout. However, some people may feel anxious that they cannot hear the phone ring when the phone is stored in the bag as an example. As a result, they will place the phone on any surface of the training-related equipment.

Cyclists, as another example, would like to carry a water bottle and an accessory, such as GPS or mobile phone during riding. Therefore, a bottle holder becomes a standard feature for most bicycles to hold the water bottle. However, the cyclists must purchase an added-on holder to hold the accessory onto the bicycle.

The common concern for the exercisers is that the mobile phone or other electronic devices cannot be well protected. Especially for the smart phone, the touch screen thereof can be easily cracked by simply dropping on the floor. Therefore, the phone should be well-protected and easy accessible during workout.

SUMMARY OF THE PRESENT INVENTION

The invention is advantageous in that it provides a beverage bottle integrated with an accessible station not only providing a window cavity for accommodating an object having an appropriate size, such as a portable electronic device, keys and/or a wallet, with protection feature but also allowing the user to quickly access the portable electronic device in the accessible station.

Another advantage of the invention is to a beverage bottle with an accessible station, wherein the accessible station comprises a sheltering screen which is movable to selectively enclose the window cavity, such that the user is able to actuate the sheltering screen to access the portable electronic device.

Another advantage of the invention is to a beverage bottle with an accessible station, wherein the portable electronic device is supported at the center portion of the beverage bottle to enhance the protection of the portable electronic device.

Another advantage of the invention is to a beverage bottle with an accessible station, which further provides a power station for electrically charging the portable electronic device in the window cavity.

Another advantage of the invention is to a beverage bottle with an accessible station, wherein the beverage bottle can be held by any existing bottle holder without altering its original structure. Therefore, the user is able to carry the beverage bottle with the portable electronic device at the same time.

Additional advantages and features of the invention will become apparent from the description which follows, and may be realized by means of the instrumentalities and combinations particular point out in the appended claims.

According to the present invention, the foregoing and other objects and advantages are attained by a beverage bottle for an object, such as a portable electronic device, which comprises:

a hand-held container comprising a surrounding wall and having a fluid compartment formed within the surrounding wall; and an accessible station integrated with the hand-held container, wherein the accessible station has a window cavity for accommodating the object therein.

In accordance with another aspect of the invention, the present invention comprises a method of protecting and carrying an object, such as a portable electronic device, by a beverage bottle, which comprises the following steps.

(1) Integrate an accessible station with a hand-held container which has a fluid compartment formed within a surrounding wall of the hand-held container.

(2) Accommodate the object in a window cavity of the accessible station to protect the portable electronic device therein.

In accordance with another aspect of the invention, the present invention comprises a beverage bottle, which comprises:

a hand-held container comprising a surrounding wall and having a fluid compartment formed within the surrounding wall; and a utility base coupled with the hand-held container, wherein said utility base comprises a base casing detachably coupled at a bottom portion of said hand-held container and an audio module supported in the base casing for generating an audio output.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
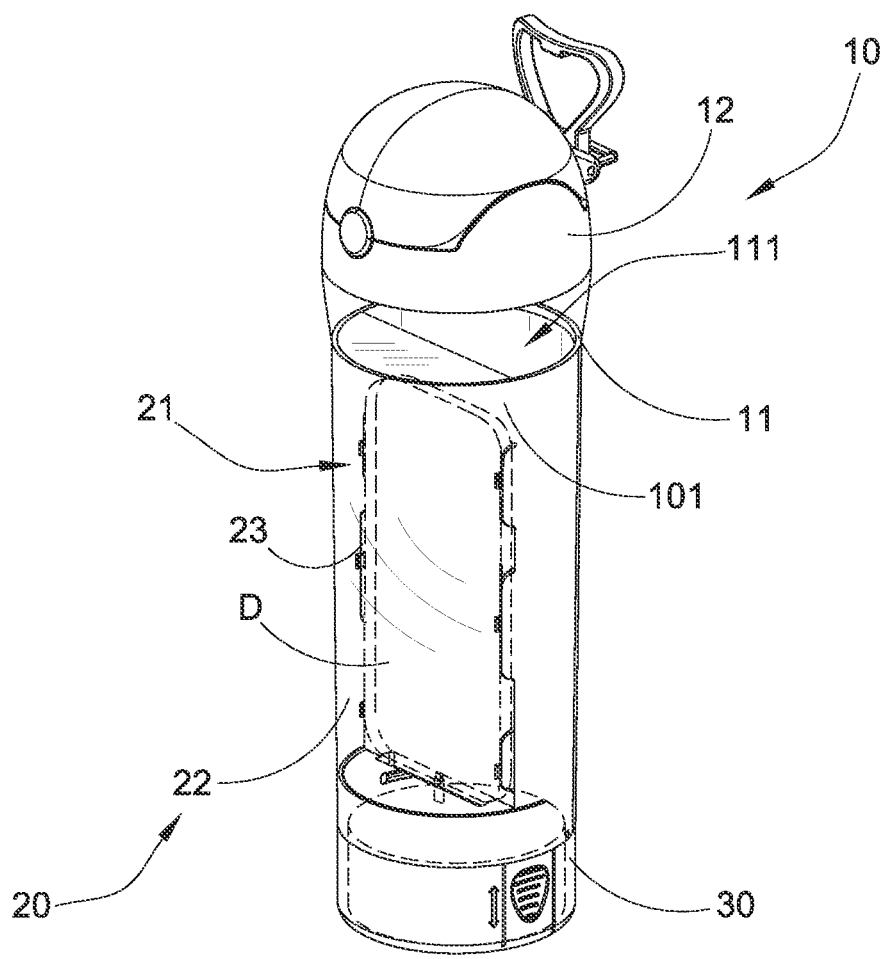
FIG. 1 is a perspective view of a beverage bottle with an accessible station for a portable electronic device according to a preferred embodiment of the present invention, illustrating the enclosed position of the sheltering screen.
Figure 2:
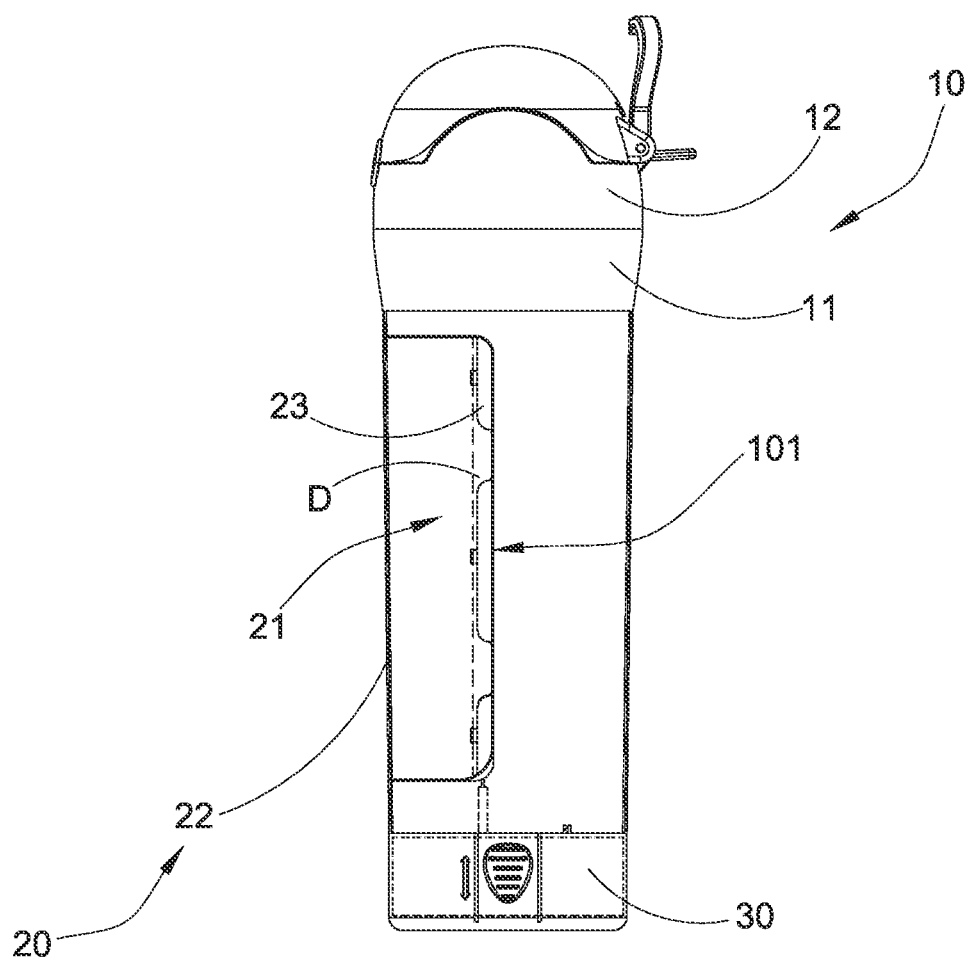
FIG. 2 is an exploded perspective view of the beverage bottle with the accessible station according to the above preferred embodiment of the present invention.
Figure 3:
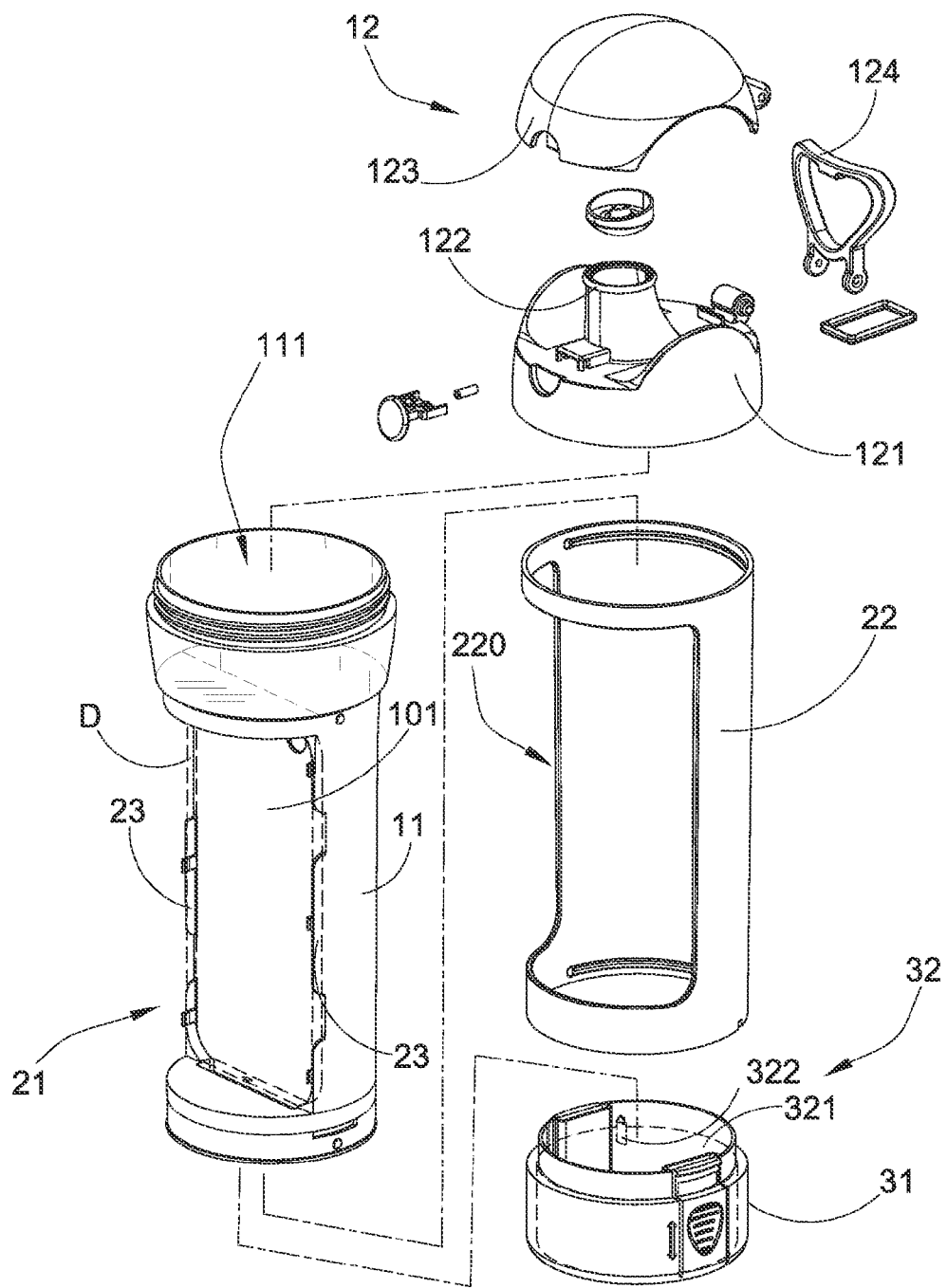
FIG. 3 is a side view of the beverage bottle with the accessible station according to the above preferred embodiment of the present invention, illustrating the portable electronic device being charged by the utility base.
Figure 4:
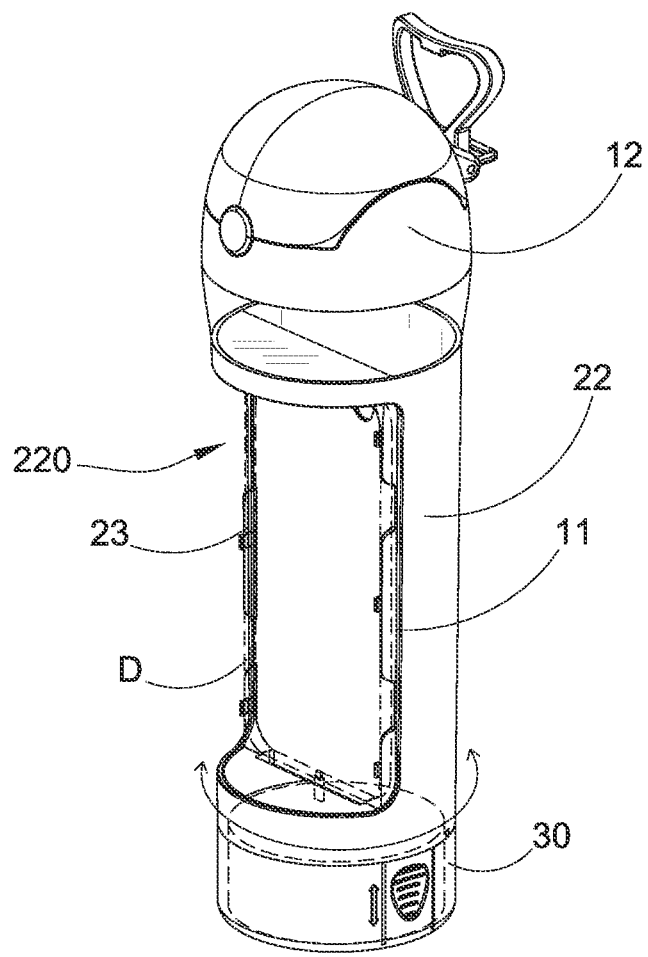
FIG. 4 is a perspective view of the beverage bottle with the accessible station according to the above preferred embodiment of the present invention, illustrating the accessible position of the sheltering screen.

Referring to FIGS. 1 to 3 of the drawings, a beverage bottle for an object having an appropriate size, such as a key, a wallet and/or a portable electronic device D, according to a preferred embodiment of the present invention is illustrated, wherein the beverage bottle comprises a hand-held container 10, an accessible station 20 integrated with the hand-held container 10, and a utility base 30. The portable electronic device D, such as a mobile phone, as an example to illustrate in the preferred embodiment to show how to protect the object in the beverage bottle. Accordingly, the accessible station 20 serves as an accessible phone station when the mobile phone is held therein.

As shown in FIGS. 1 to 3, the hand-held container 10 comprises a surrounding wall 11 and having a fluid compartment 111 formed within the surrounding wall 11, and a spout unit 12 detachably coupled with the surrounding wall 11 to communicate with the fluid compartment 111 thereof.

Accordingly, the held-held container 10 is made of safe-to-reuse and non-toxic material, such as BPA-free plastic. The surrounding wall 11 generally has a tubular configuration and defines top and bottom edges, wherein fluid compartment 11 is formed within the surrounding wall 11 with a top fluid opening, such that fluid can be filled into the fluid compartment 111 through the top fluid opening.

The spout unit 12 is detachably coupled at the top edge of the surrounding wall 11, wherein the spout unit 12 comprises spout member 121 detachably coupled with the surrounding wall 11, a mouth piece 122 upwardly extended from the spout member 121 for communicating with the fluid compartment 11, a cap 123 pivotally coupled with the spout member 121 for selectively covering the mouth piece 121, and a carrying unit 124, such as a carrying ring, extended from the spout member 121 for hanging the held-held container 10 at a fixture. Accordingly, the utility base 30 is detachably coupled at the bottom edge of the surrounding wall 11, such that the surrounding wall 11 is located between the spout unit 12 and the utility base 30.

The accessible station 20 has a window cavity 21 formed with the surrounding wall 11 of the hand-held container 10 for accommodating the portable electronic device D in the window cavity 21. Accordingly, the window cavity 21 is indented on the surrounding wall 11 of the hand-held container 10 to define a common compartment wall 101 between the window cavity 21 and the fluid compartment 111. In particular, the window cavity 21 is formed with the surrounding wall 11 between the top and bottom edges thereof, such that a window opening of the window cavity 21 faces in a radial direction of the surrounding wall 11. In other words, the fluid compartment 111 and the window cavity 21 are two individual cavities that the fluid in the fluid compartment 111 cannot enter into the window cavity 21.

According to the preferred embodiment, the accessible station 20 comprises a sheltering screen 22 movably coupled at the surrounding wall 11 to selectively enclose the window cavity 21 so as to protect the portable electronic device D therein.

The sheltering screen 22 is formed in a tubular shape having a diameter slightly larger than a diameter of the surrounding wall 11, wherein the sheltering screen 22 is coaxially and rotatably coupled with the surrounding wall 11 at a position that a top edge of the sheltering screen 22 is aligned with the top edge of the surrounding wall 11 while a bottom edge of the sheltering screen 22 is aligned with the top bottom of the surrounding wall 11. Furthermore, the sheltering screen 22 is locked by the spout unit 12 and the utility base 30 when the top and bottom edges of the surrounding wall 11 are detachably engaged with the spout unit 12 and the utility base 30 respectively, so as to prevent any sliding movement of the sheltering screen 22 along the surrounding wall 11. It is worth mentioning that a guiding groove is formed at each of the spout unit 12 and the utility base 30, wherein the top and bottom edges of the sheltering screen 22 are engaged with the guiding groove at the spout unit 12 and the utility base 30 respectively, so as to enable the sheltering screen 22 to be rotated around the surrounding wall 11.

The sheltering screen 22 has a screen opening 220 formed between the top and bottom edges thereof, wherein a size and shape of the screen opening 220 matches with the size and shape of the window opening of the window cavity 21. Therefore, the sheltering screen 22 is adapted to be rotated between an accessible position and an enclosed position. In the accessible position, the sheltering screen 22 is rotated around the surrounding wall 11 to align the screen opening 220 with the window cavity 21, such that the user is able to access the portable electronic device D through the screen opening 220. In the enclosed position, the sheltering screen 22 is rotated around the surrounding wall 11 to misalign the screen opening 220 with the window cavity 21, such that the portable electronic device D is enclosed within the window cavity 21 and protected by the sheltering screen 22.

Preferably, the sheltering screen 22 is made of transparent and rigid material, such that the portable electronic device D can be seen through the sheltering screen 22 in the enclosed position. The curvature of the sheltering screen 22 matches with the curvature of the surrounding wall 11, such that the sheltering screen 22 further serves as a convex lens for enlarging the screen of the portable electronic device D. Therefore, the user is able to quickly access the mobile phone as an example by rotating the sheltering screen 22 in the accessible position. After using the mobile phone, the user is able to quickly close the window cavity 21 by rotating the sheltering screen 22 back to the enclosed position. It is worth mentioning that the portable electronic device D is received at a center portion of the surrounding wall 11 and within the window cavity 21, the portable electronic device D will be located at the center of mass of the hand-held container 10 so as to enhance the protection of the portable electronic device D by the surrounding wall 11 and the sheltering screen 22. In addition, when the fluid is filled in the fluid compartment 111, the fluid will also become excellent shock absorption medium for absorbing shock when the hand-held container 10 is dropped on the floor.

In order to securely support the portable electronic device D within the window cavity 21, the accessible station 20 further comprises a plurality of holder units 23 spacedly formed in the window cavity 21 for detachably holding the portable electronic device D in position. Preferably, the holder units 23 are edge holders spacedly formed at two side edges of the window cavity 21, i.e. the common compartment wall 101, for detachably holding two side edges of the portable electronic device D. It is appreciated that when the mobile phone is supported in the window cavity 21 via the holder units 23, a touch screen of the mobile phone is facing toward the window opening of the window cavity 21. In other words, the user is able to access the touch screen of the mobile phone by rotating the sheltering screen 22 in the accessible position without taking the mobile phone out of the window cavity 21.

It is worth mentioning that the diameter size of the hand-held container 10 is the same as the diameter size of the existing water bottle, such that the beverage container of the present invention can be held by any existing bottle holder.

As shown in FIGS. 1 to 3, the utility base 30 comprises a base casing 31 detachably coupled at a bottom portion of the hand-held container 10 and a power source unit 32 supported in the base casing 31 for electrically connecting to the portable electronic device D within the window cavity 21. Accordingly, the base casing 31 is detachably coupled at the bottom edge of the surrounding wall 11 to lock up the sheltering screen 22 that the sheltering screen 22 is only allowed to be rotated around the surrounding wall 11. The base casing 31 has two quick releasing clipping arms detachably coupled with the bottom edge of the surrounding wall 11.

The power source unit 32 comprises a rechargeable battery 321 disposed in the base casing 31 and a charging terminal 322 upwardly and operatively extended from the rechargeable battery 321 through a bottom wall of the window cavity 21 for electrically connecting with a charging port of the portable electronic device D. Therefore, the portable electronic device D can be protected within the window cavity 21 and can be charged by the power source unit 32 at the same time, so as to prevent the portable electronic device D being out of battery during workout. Preferably, the charging terminal 322 of the power source unit 32 is a USB interface.

The power source unit 32 further comprises a recharging port 323 provided at the base casing 31 for charging the rechargeable battery 321 via a power charging cable to a power outlet. The power source unit 32 further comprises a power indicator 324 provided at the base casing 31 for indicating the power status of the rechargeable battery 321, such as charging status and low-power warning status.

Figure 10:
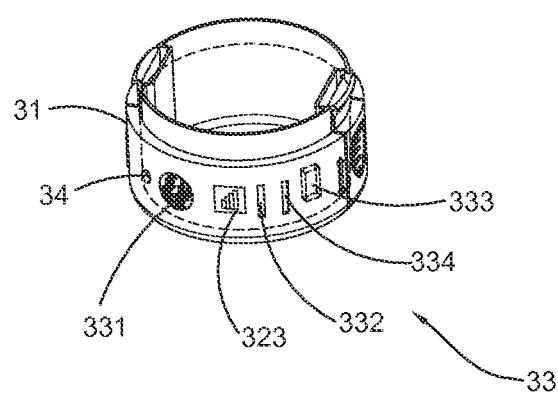
FIG. 10 is a modification of the utility base of the beverage bottle according to the above preferred embodiment of the present invention.

Accordingly, the power indicator 324 is embodied as a power displaying element electrically connected with the rechargeable battery 321 of the power source unit 32 for displaying the electrical power stored in the rechargeable battery 321, as shown in FIG. 10. It is worth mentioning that the power indicator 324 may be a power indicating lamp or a power display screen capable of displaying the electrical power stored in the rechargeable battery 321 or the percentage ratio of the reserved charge to the full charge of the rechargeable battery 321. It is apparent to these skilled in the art that the power indicator 324 may be any other displaying members capable of displaying the electrical power stored in the rechargeable battery 321.

It is appreciated that a replaceable battery or the like can be received in the base casing 31 instead of the rechargeable battery 321 for charging the portable electronic device D. Preferably, the rechargeable battery 321 has a predetermined weight applied at the bottom portion of the beverage container to stabilize the beverage container when the beverage container is supported on a surface in an upright manner.

Furthermore, the utility base 30 comprises an audio module 33 provided at the outer surface of the base casing 31 for operatively linking to an audio inlet of the portable electronic device D in the window cavity 21. Therefore, the user is able to listen to the music or answer the phone via an audio cable connecting to the audio module 33.

As shown in FIG. 10, the utility base 30 is modified that the audio module 33 is supported in the base casing 321, wherein the audio module 33 comprises at least a speaker 331, an audio input 332 provided in an outer side of the base casing 31 and/or a signal receiving module 333 being capable of receiving wireless audio signal, wherein the audio input 332 and the signal receiving module 333 are electrically connected with the speaker 331. More preferably, the audio module 33 further comprises an audio interface 334 provided in the base casing 31, wherein the audio interface 334 is extended to the accessible station 20, such that the portable electronic device D may be electrically connected to the audio interface 334. The audio interface 334 is electrically connected with the speaker 331 such that the portable electronic device D is able to provide audio signal for the audio module 33 via the audio interface 334. It is appreciate that each of the audio input 332 and the audio interface 334 may be a RCA analog audio interface, a S/PDIF audio interface, a Digital a Coaxial audio interface, an optical fiber audio interface, a balance simulator audio interface such as XLR audio interface or combination thereof. Each of the audio input 332 and the audio interface 334 may be any other interface capable of achieving the audio signal input/output function, for example USB interface. Preferably, the audio module 33 comprises at least an adjusting and controlling button for achieving the control function of adjusting output volume, selecting play a playlist and/or power control.

As shown in FIG. 3, the utility base 30 further comprises a lighting unit 34 disposed at the bottom of the base casing 31 and electrically linked to the rechargeable battery 321. The lighting unit 34, such as a flashlight unit, comprises a plurality of light sources, such as LEDs on a circuit board, supported on a bottom wall of the base casing 31 and electrically linked to the power source unit 32. Preferably, the lighting unit 34 is electrically linked to the rechargeable battery 321 so as to provide electrical power to the lighting unit 34. When the light sources are activated for generating illumination light, the light can pass through the bottom wall of the base casing 31. It is worth mentioning that the bottom wall of the base casing 31 is transparent.

The utility base 30 further comprises a control panel 35 provided at the base casing 31 for selectively controlling operations of the lighting unit 34 and the portable electronic device D. Accordingly, the control panel 35 comprises a light operating switch 351 operatively linked to the lighting unit 34 to control the lighting unit 34 in an on-and-off manner. The control panel 35 further comprises a device control switch 352 operatively linked to the portable electronic device D when the portable electronic device D is operatively connected to the charging terminal 322. For example, the device control switch 352 can selectively control the audio volume and song selection of the portable electronic device D. Preferably, the power indicator 324 is incorporated with the control panel 35 that an integrated circuitry is formed to control the power source unit 32, the lighting unit 34, and the portable electronic device D.

Figure 5:
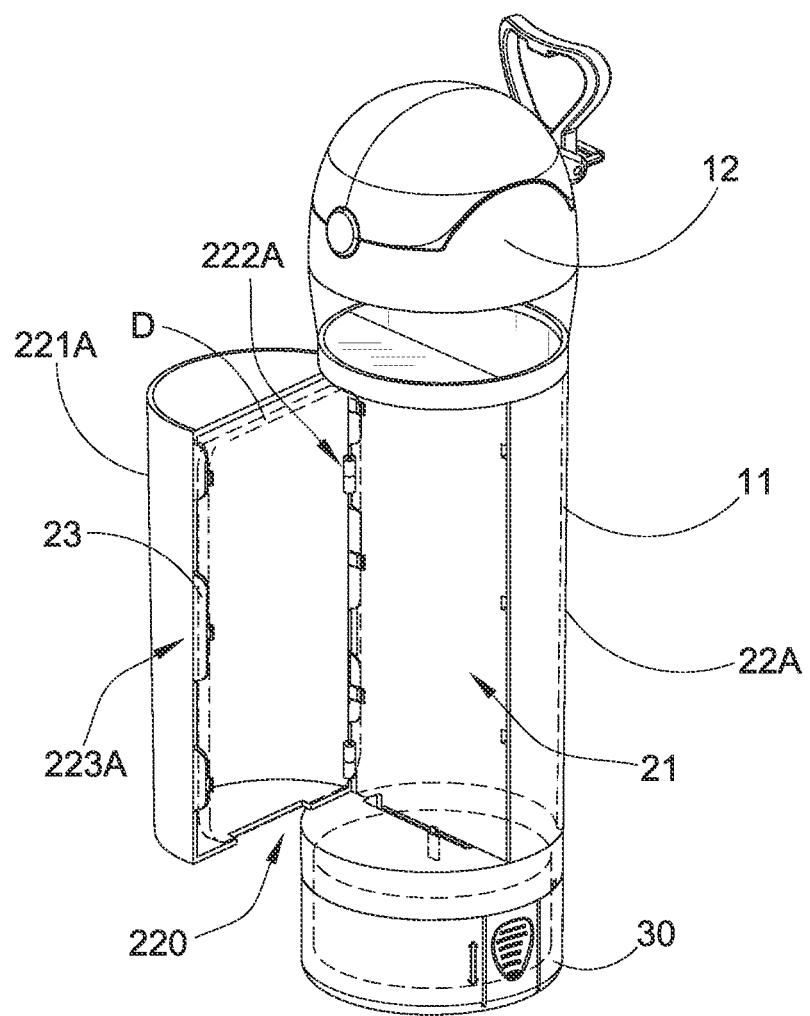
FIG. 5 illustrates a first modification of the sheltering screen of the accessible station according to the above preferred embodiment of the present invention.

FIG. 5 illustrates a first modification of the beverage container, wherein the sheltering screen 22A is pivotally moved with respect to the surrounding wall 11 to selectively enclose the window cavity 21. In other words, the sheltering screen 22A is locked by the spout unit 12 and the utility base 30 to prevent a rotational movement of the sheltering screen 22A with respect to the surrounding wall 11.

In particular, the sheltering screen 22A comprises a screen door 221A having a pivotal side edge 222A pivotally provided along a first side edge of the window cavity 21, and an opposed lockable side edge 223A releasably locked at an opposed second side edge of the window cavity 21. Therefore, the screen door 221A can be pivotally and sidewardly opened to expose the window cavity 21 for the user to access the portable electronic device D therein.

Accordingly, the pivotal side edge 222A of the screen door 221A is pivotally coupled at one side edge of the screen opening 220 which aligns with the first side edge of the window cavity 21. The lockable side edge 223A releasably locked at an opposed side edge of the screen opening 220 which aligns with the second side edge of the window cavity 21. Since the sheltering screen 22A cannot be rotated around the surrounding wall 11, the screen door 221A will always align with the window cavity 21.

As shown in FIG. 5, the holder units 23 are spacedly provided at an inner side of the sheltering screen 22A for detachably holding the portable electronic device D in position. In particular, the holder units 23 are provided at the inner side of the screen door 221A, such that when the screen door 221A is moved to open the window screen 21, the portable electronic device D is automatically removed out of the window screen 21, and when the screen door 221A is moved to close the window screen 21, the portable electronic device D is automatically received in the window screen 21.

Accordingly, the screen door 221A can be configured in a curved shape to match the curvature of the screen door 221A with the curvature of the surrounding wall 11, such that when the screen door 221A is pivotally moved to close the window cavity 21, the surrounding wall 11 and the screen door 221A form a circular cross section.

Figure 6:
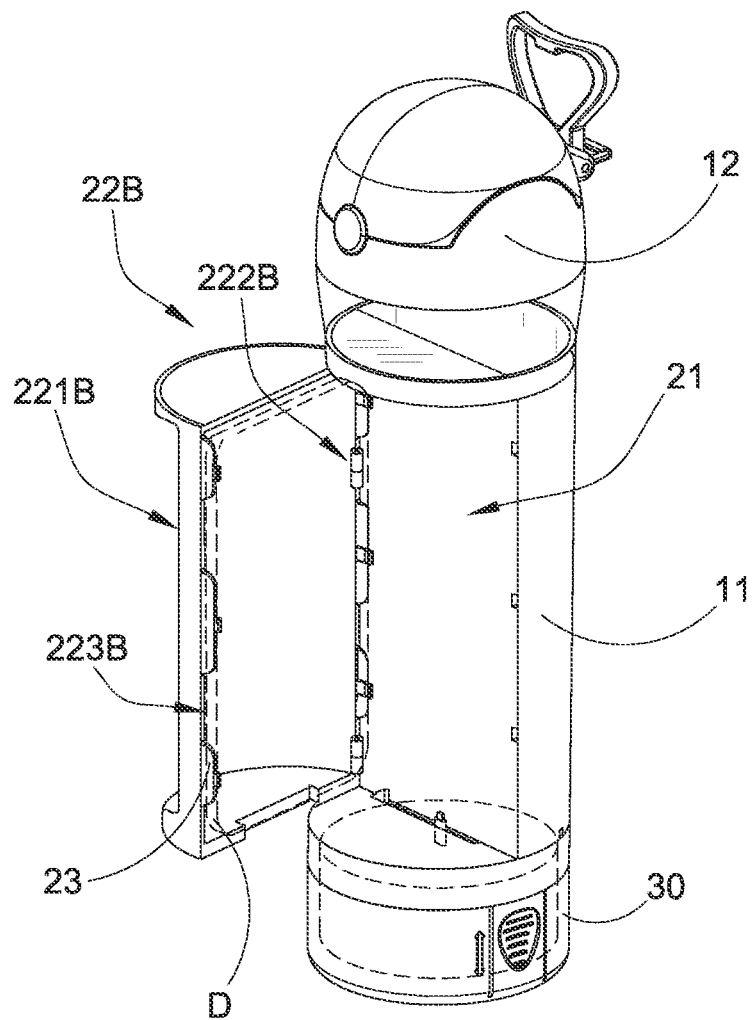
FIG. 6 illustrates the flat transparent screen of the first modification the sheltering screen of the accessible station according to the above preferred embodiment of the present invention.

Alternatively, the screen door 221B can be a flat transparent screen made of touch response material, such as tempered glass, and is arranged for overlapping on the touch screen of the portable electronic device D, as shown in FIG. 6. Therefore, the user is able to directly access the touch screen of the portable electronic device D without opening the screen door 221B.

It is appreciated that the screen door 221B can be directly coupled at the surrounding wall 11. In other words, the pivotal side edge 222B of the screen door 221B is pivotally coupled at the surrounding wall 11 along the first side edge of the window cavity 21 while the lockable side edge 223B releasably locked at the surrounding wall 11 along the second side edge of the window cavity 21. Therefore, the sheltering screen 22B is formed as the screen door 221B without encircling the surrounding wall 11, so as to reduce the material cost of the sheltering screen 22B, as shown in FIG. 6.

Figure 7:
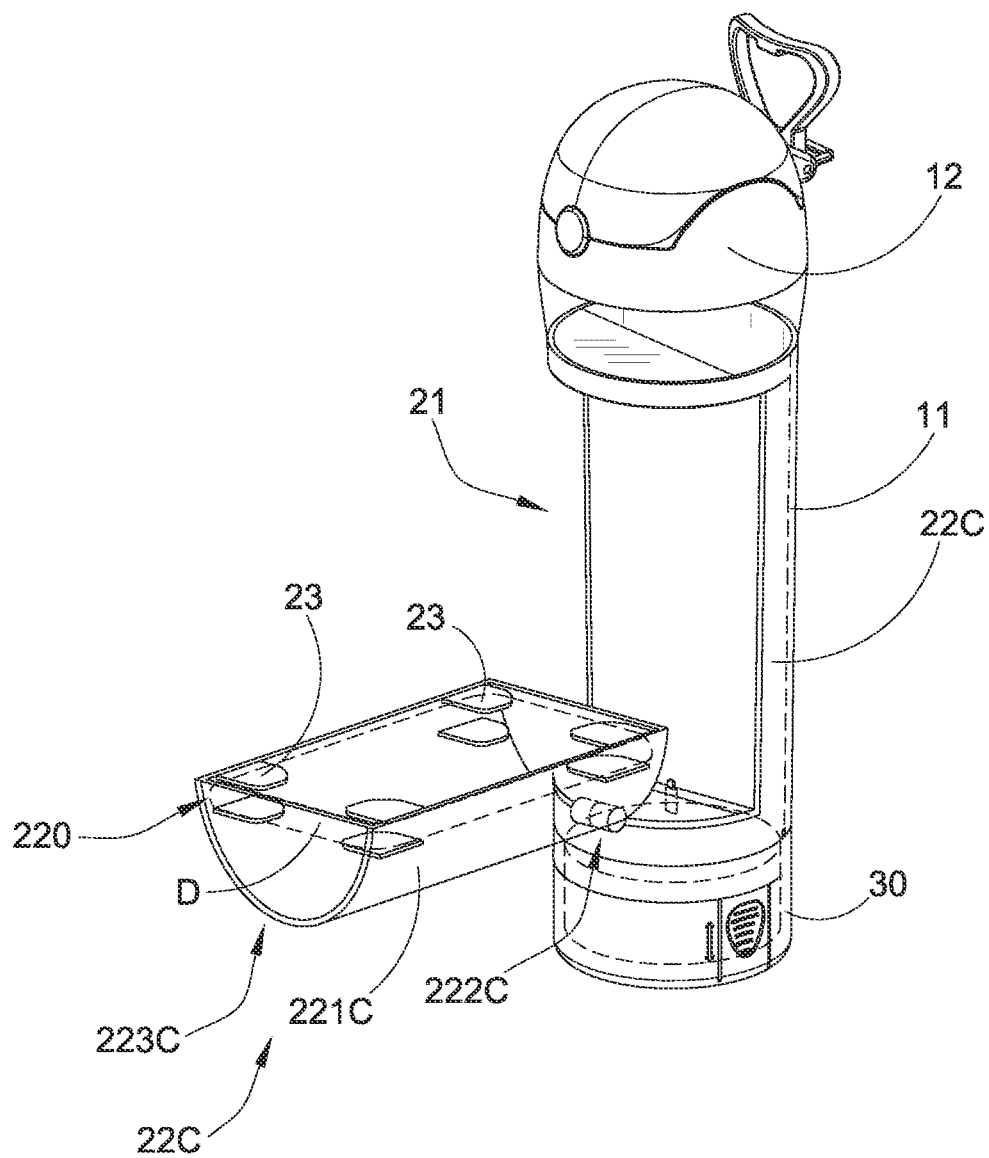
FIG. 7 illustrates a second modification of the sheltering screen of the accessible station according to the above preferred embodiment of the present invention.

FIG. 7 illustrates a second modification of the beverage container, wherein the sheltering screen 22C comprises a screen door 221C having a pivotal bottom edge 222C pivotally provided along a bottom edge of the window cavity 21, and an opposed lockable top edge 223C releasably locked at a top edge of the window cavity 21. Therefore, the screen door 221C can be pivotally and downwardly opened to expose the window cavity 21 for the user to access the portable electronic device D therein.

Accordingly, the pivotal side edge 222C of the screen door 221C is pivotally coupled at a bottom edge of the screen opening 220 which aligns with the bottom edge of the window cavity 21. The lockable side edge 223C releasably locked at a top edge of the screen opening 220 which aligns with the top edge of the window cavity 21. Since the sheltering screen 22C cannot be rotated around the surrounding wall 11, the screen door 221C will always align with the window cavity 21.

Likewise, the holder units 23 are spacedly provided at an inner side of the sheltering screen 22C for detachably holding the portable electronic device D in position. In particular, the holder units 23 are provided at the inner side of the screen door 221C, such that when the screen door 221C is moved to open the window screen 21, the portable electronic device D is automatically removed out of the window screen 21, and when the screen door 221C is moved to close the window screen 21, the portable electronic device D is automatically received in the window screen 21.

Accordingly, the screen door 221C can be configured in a curved shape to match the curvature of the screen door 221C with the curvature of the surrounding wall 11, such that when the screen door 221C is pivotally moved to close the window cavity 21, the surrounding wall 11 and the screen door 221C form a circular cross section.

Figure 8:
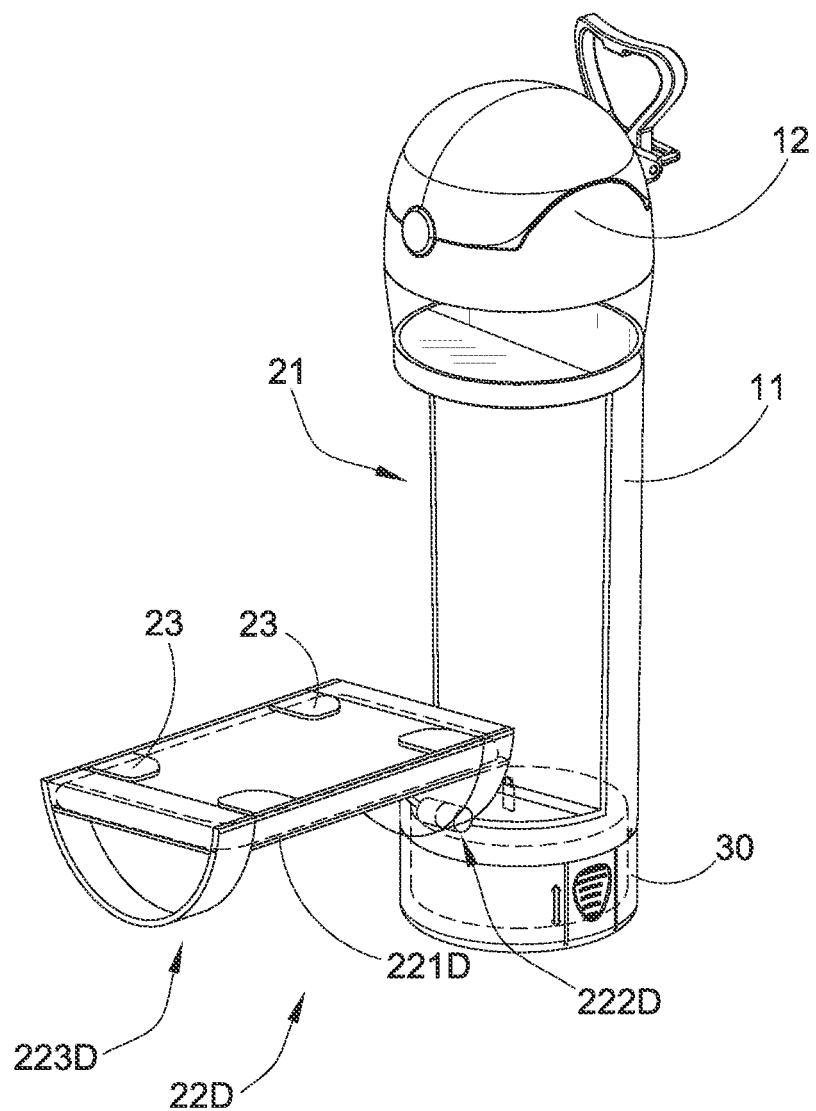
FIG. 8 illustrates the flat transparent screen of the second modification of the sheltering screen of the accessible station according to the above preferred embodiment of the present invention.

Alternatively, the screen door 221D can be a flat transparent screen made of touch response material, such as tempered glass, and is arranged for overlapping on the touch screen of the portable electronic device D, as shown in FIG. 8. Therefore, the user is able to directly access the touch screen of the portable electronic device D without opening the screen door 221D.

It is appreciated that the screen door 221D can be directly coupled at the surrounding wall 11. In other words, the pivotal bottom edge 222D of the screen door 221D is pivotally coupled at the surrounding wall 11 along the bottom edge of the window cavity 21 while the lockable top edge 223D releasably locked at the surrounding wall 11 along the top edge of the window cavity 21. Therefore, the sheltering screen 22D is formed as the screen door 22D without encircling the surrounding wall 11, so as to reduce the material cost of the sheltering screen 22D.

Figure 9:
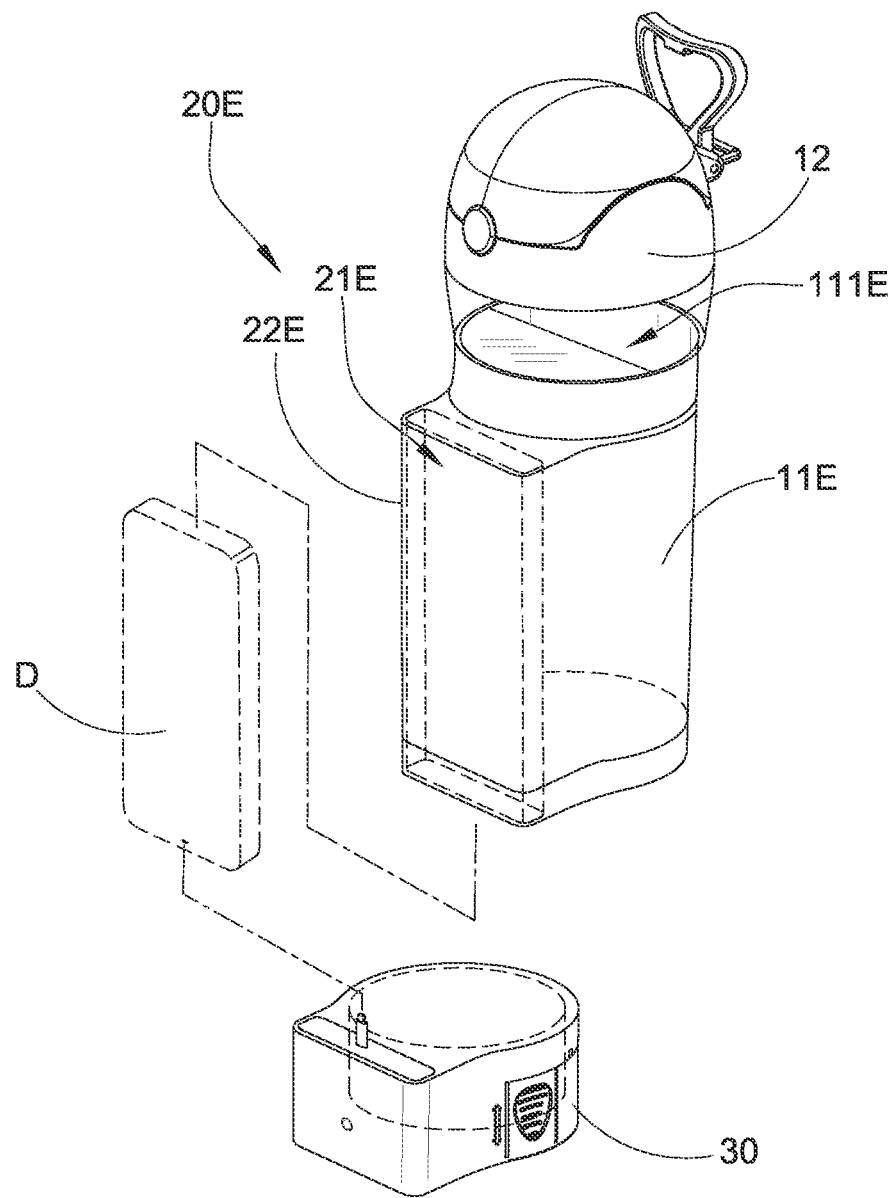
FIG. 9 illustrates a third modification of the sheltering screen of the accessible station according to the above preferred embodiment of the present invention.

FIG. 9 illustrates an alternative mode of the accessible station 20E which comprises a sheltering screen 22E protruded from the surrounding wall 11E at a position that a portion of the surrounding wall 11E forms a common compartment wall between the window cavity 21E and the fluid compartment 111E, such that the window cavity 21E is formed between the sheltering screen 22E and the surrounding wall 11E.

Accordingly, the window cavity 21E has an elongated bottom opening to align with the bottom edge of the surrounding wall 11E, such that the portable electronic device D is slidably received in the window cavity 21E through the bottom opening. In addition, the utility base 30E is detachably coupled at the bottom edge of the surrounding wall 11E to cover the bottom opening so as to enclose the window cavity 21E. In order to remove the portable electronic device D from the window cavity 21E, the utility base 30E can be detached from the surrounding wall 11E, such that the portable electronic device D can be slid out of the window cavity 21E through the bottom opening thereof. Preferably, a cushioning layer is provided at a ceiling of the window cavity 21E to prevent any unwanted movement of the portable electronic device D within the window cavity 21E. Preferably, the sheltering screen 22E is a flat transparent screen made of touch response material and is arranged for overlapping on the touch screen of the portable electronic device D. Therefore, the user is able to directly access the touch screen of the portable electronic device D without taking the portable electronic device D out of the window cavity 21E.

Accordingly, the present invention further provides a method of protecting and carrying a portable electronic device D by the beverage bottle, which comprises the following steps.

(1) Integrate the accessible station 20 with the hand-held container 10 to form the fluid compartment 111 and the window cavity 21.

(2) Accommodate the portable electronic device D in the window cavity 21 of the accessible station 21 to protect the portable electronic device D therein.

(3) Move the sheltering screen 22 to selectively enclose the portable electronic device D in the window cavity 21.

In the step (3), the sheltering screen 22 can be moved by rotating the sheltering screen 22 around the surrounding wall 1 to open up the window cavity 21 when the screen opening 22 is aligned therewith. The screen door 221A, 221B of the sheltering screen 22A, 22B can be pivotally opened sideward to open up the window cavity 21. The screen door 221C, 221D of the sheltering screen 22C, 22D can be pivotally opened downward to open up the window cavity 21. Alternatively, the touch screen of the portable electronic device D can be directly accessed through the sheltering screen 22 without taking the portable electronic device D out of the window cavity 21.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A beverage bottle for a portable electronic device, comprising:
   a hand-held container comprising a spout unit and a surrounding wall and having a fluid compartment formed within said surrounding wall, wherein said spout unit is coupled at a top edge of said surrounding wall to enclose said fluid compartment; and
   an accessible station integrated with said hand-held container, wherein said accessible station comprises a sheltering screen and has a window cavity for accommodating the portable electronic device therein, wherein said window cavity has a window opening formed at said surrounding wall of said hand-held container and being closed by said sheltering screen, such that said window cavity is configured for allowing the portable electronic device to be accessed through said window opening while said fluid compartment is remained enclosed by said spout unit.

2. The beverage bottle, as recited in claim 1, wherein said window cavity is indented on said surrounding wall of said hand-held container to define a common compartment wall between said window cavity and said fluid compartment, such that said window cavity is formed at one side of said common compartment wall and said fluid compartment is formed at another side of said common compartment wall.

3. The beverage bottle, as recited in claim 1, wherein said sheltering screen is movably coupled at said surrounding wall to selectively enclose said window cavity when closing said window opening and to selectively expose said window cavity when opening said window opening.

4. The beverage bottle, as recited in claim 2, wherein said sheltering screen is movably coupled at said surrounding wall to selectively enclose said window cavity when closing said window opening and to selectively expose said window cavity when opening said window opening.

5. The beverage bottle, as recited in claim 3, wherein said sheltering screen, which is formed in a tubular shape, has a screen opening, coaxially and rotatably coupled with said surrounding wall, such that said sheltering screen is rotated around said surrounding wall to align said screen opening with said window cavity for accessing the portable electronic device, and is rotated around said surrounding wall to misalign said screen opening with said window cavity for enclosing the portable electronic device within said window cavity.

6. The beverage bottle, as recited in claim 4, wherein said sheltering screen, which is formed in a tubular shape, has a screen opening, coaxially and rotatably coupled with said surrounding wall, such that said sheltering screen is rotated around said surrounding wall to align said screen opening with said window cavity for accessing the portable electronic device, and is rotated around said surrounding wall to misalign said screen opening with said window cavity for enclosing the portable electronic device within said window cavity.

7. The beverage bottle, as recited in claim 6, wherein said accessible station comprises a plurality of holder units spacedly supported in said window cavity for detachably holding the portable electronic device in position.

8. The beverage bottle, as recited in claim 3, wherein said sheltering screen is pivotally moved with respect to said surrounding wall to selectively enclose said window cavity.

9. The beverage bottle, as recited in claim 4, wherein said sheltering screen is pivotally moved with respect to said surrounding wall to selectively enclose said window cavity.

10. The beverage bottle, as recited in claim 9, wherein said accessible station comprises a plurality of holder units spacedly provided at an inner side of said sheltering screen for detachably holding the portable electronic device in position.

11. The beverage bottle, as recited in claim 10, wherein said sheltering screen comprises a screen door having a pivotal side edge pivotally provided along a first side edge of said window cavity, and an opposed lockable side edge releasably locked at an opposed second side edge of said window cavity.

12. The beverage bottle, as recited in claim 10, wherein said sheltering screen comprises a screen door having a pivotal bottom edge pivotally provided along a bottom edge of said window cavity, and an opposed lockable top edge releasably locked at an opposed top edge of said window cavity.

13. The beverage bottle, as recited in claim 11, wherein said screen door is a flat transparent screen made of touch response material and is arranged for overlapping on a touch screen of the portable electronic device.

14. The beverage bottle, as recited in claim 12, wherein said screen door is a flat transparent screen made of touch response material and is arranged for overlapping on a touch screen of the portable electronic device.

15. The beverage bottle, as recited in claim 1, further comprising a utility base, wherein said utility base comprises a base casing detachably coupled at a bottom portion of said hand-held container and a power source unit supported in said base casing for electrically connecting to the portable electronic device within said window cavity.

16. The beverage bottle, as recited in claim 6, further comprising a utility base, wherein said utility base comprises a base casing detachably coupled at a bottom portion of said hand-held container and a power source unit supported in said base casing for electrically connecting to the portable electronic device within said window cavity.

17. The beverage bottle, as recited in claim 9, further comprising a utility base, wherein said utility base comprises a base casing detachably coupled at a bottom portion of said hand-held container and a power source unit supported in said base casing for electrically connecting to the portable electronic device within said window cavity.

18. The beverage bottle, as recited in claim 15, wherein said utility base comprises further comprises a lighting unit which is disposed at a bottom of said base casing and is electrically linked at said power source unit, and a control panel provided on said base casing for selectively controlling operations of said lighting unit and the portable electronic device.

19. The beverage bottle, as recited in claim 16, wherein said utility base comprises further comprises a lighting unit which is disposed at a bottom of said base casing and is electrically linked at said power source unit, and a control panel provided on said base casing for selectively controlling operations of said lighting unit and the portable electronic device.

20. The beverage bottle, as recited in claim 17, wherein said utility base comprises further comprises a lighting unit which is disposed at a bottom of said base casing and is electrically linked at said power source unit, and a control panel provided on said base casing for selectively controlling operations of said lighting unit and the portable electronic device.

21. The beverage bottle, as recited in claim 1, wherein said accessible station comprises a sheltering screen protruded from said surrounding wall at a position that a portion of said surrounding wall forms a common compartment wall between said window cavity and said fluid compartment, such that said window cavity, having a bottom opening, is formed between said sheltering screen and said surrounding wall.

22. The beverage bottle, as recited in claim 9, further comprising a utility base, wherein said utility base comprises a base casing detachably coupled at a bottom portion of said hand-held container to cover said bottom opening of said window cavity and a power source unit supported in said base casing for electrically connecting to the portable electronic device within said window cavity.

23. The beverage bottle, as recited in claim 19, wherein said sheltering screen is a flat transparent screen made of touch response material and is arranged for overlapping on a touch screen of the portable electronic device.

24. The beverage bottle, as recited in claim 23, wherein said utility base comprises further comprises a lighting unit which is disposed at a bottom of said base casing and is electrically linked at said power source unit, and a control panel provided on said base casing for selectively controlling operations of said lighting unit and the portable electronic device.

* * * * *